United States Patent [19]
Zorn

[11] 3,975,630
[45] Aug. 17, 1976

[54] METHOD OF GUIDING A LIGHT BEAM ON AN OPTICAL SIGNAL TRACK

[75] Inventor: Karl-Ludwig Zorn, Berlin, Germany

[73] Assignee: Robert Bosch G.m.b.H., Stuttgart, Germany

[22] Filed: Apr. 11, 1975

[21] Appl. No.: 567,283

[30] Foreign Application Priority Data
Apr. 13, 1974 Germany.............................. 2418195

[52] U.S. Cl......................... 250/202; 179/100.3 C; 179/100.3 V; 179/100.41 L; 250/570
[51] Int. Cl.²..................... G11B 7/00; G05B 1/00
[58] Field of Search................... 250/570, 202, 204; 179/100.3 V, 100.3 D, 100.3 C, 100.3 G, 100.3 M, 100.3 P, 100.4 C, 100.41 L; 340/173 LT; 178/6.7 A, DIG. 29

[56] References Cited
UNITED STATES PATENTS

| | | |
|---|---|---|
| 3,138,669 | 6/1964 | Rabinow et al.......... 179/100.3 V X |
| 3,567,855 | 3/1971 | Hamisch........................ 250/202 X |
| 3,876,841 | 4/1975 | Gijsbertus et al........ 179/100.3 V X |

*Primary Examiner*—Eugene La Roche
*Attorney, Agent, or Firm*—William R. Woodward

[57] ABSTRACT

The principle of the Foucault knife edge method of testing lenses is utilized by providing an imperfect focus of the reading light beam on the signal track of a moving optical record and detecting the lateral distribution of light beyond the track to produce a tracking control while a centered detector utilizes the same light beam to read the information on the track. Since the Foucault principle is used and not ordinary shadow effect, the method is operable just as much with a translucent track on an opaque record as with an opaque track on a translucent record.

6 Claims, 10 Drawing Figures

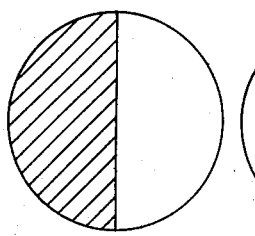
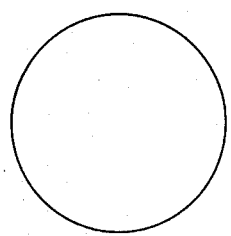
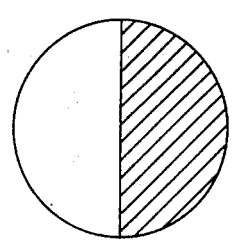
FIG.IA  FIG.IB  FIG.IC
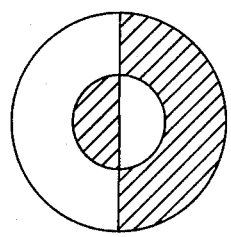
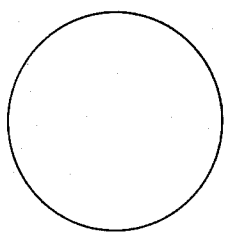
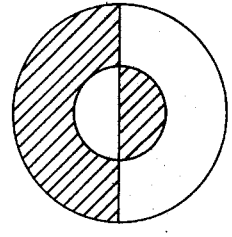
FIG.ID  FIG.IE  FIG.IF
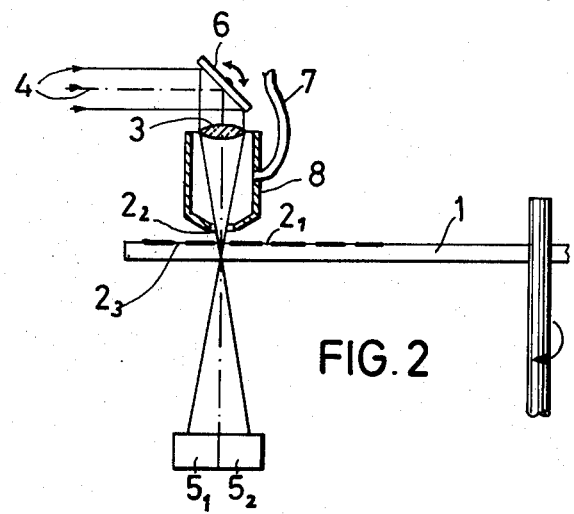
FIG.2

METHOD OF GUIDING A LIGHT BEAM ON AN OPTICAL SIGNAL TRACK

Methods are known today for recording information signals on a carrier by means of a laser beam (coherent light beam) which enable an extraordinarily high information density to be obtained because of the very small light spot produced by a laser beam. To obtain such information density, it is necessary to provide information tracks that are located close together at very small spacing. For example, the width of the signal track may be 1 micron and the spacing between centers of adjoining tracks may be about 3 microns, thus leaving an unaffected strip between tracks only 2 microns wide.

In order to read information thus stored, the signal track is illuminated by a focussed light beam which is detected to the extent that it passes through or is reflected by the track.

On account of the extremely small track dimensions, it is hardly possible, by going to extremes in expense and complication of mechanical arrangements, to hold the light beam in a readable fashion on the track except by providing a supplementary control system to cause the beam to follow the movement of the track. For the control member of such a tracking control, there is used, for example, a rapidly movable pivoted mirror at a suitable place in the light path which makes possible a lateral shift of the light spot in the record plane transversely of the orientation of the track.

In such tracking control difficult problems have been found in the attempt to provide a suitable optical signal. Such a signal must contain the information whether the light beam is deviating to the left or to the right of the track line.

It is an object of the information to provide a method for obtaining an optical tracking signal for a system of the above described kind, which is technically simple to carry out and provides reliable tracking control.

Methods are already known utilizing auxiliary light beams, one passing on each side of the track, so as to provide an unsymmetrical signal in a pair of suitably arranged photodiodes when the reading beam deviates to one side or the other. The provision of these auxiliary beams and their positioning at a suitable spacing from the main reading beam involves a significant expense in auxiliary optical devices.

It is accordingly a further object of the invention to provide a tracking method for a reading light beam in which the tracking information is obtained directly from the reading beam itself.

SUBJECT MATTER OF THE PRESENT INVENTION

Briefly, the principle of the Foucault method of testing lenses is utilized by causing the reading light beam to converge in such a way that it is imperfectly focussed where it crosses the signal track and by utilizing the lateral distribution of the light in the beam beyond the signal track in accordance with the Foucault principle to provide the tracking signals.

The Foucault principle of testing lenses for perfection of focus depends upon the phenomenon that if a knife edge is placed across a focussed light beam in the focal plane and the lens aperture is observed by eye directly behind the knife edge, all rays are simultaneously covered when the knife edge reaches the focus in the case of a perfect lens, in which case the illumination of the lens aperture vanishes in an even manner. In the case of imperfect lenses, varying unevenness of illumination is observed according to the position of the knife edge. A similar unevenness of illumination is also obtained with a highly perfect lens if the knife edge is moved into the beam in a plane which does not pass through the focus, but instead is in a more or less defocussed region of the light beam.

The above-described effect is utilized in the present invention in order to obtain a tracking signal from the same light beam that is used to pick up the signals recorded on the record track. In this case, the two lateral edges of the signal track take the place of the knife edge. Such a method requires, however, that the distance between the focussing optical system and the carrier medium for the signal track is stabilized, since otherwise the tracking signals obtained would have superposed disturbance signals resulting from spacing variations.

The method for obtaining tracking signals in the optical reading of optically contrasting signal tracks sequentially read along the length of the tracks by means of a light beam focussed by a projection lens, with the spacing between the projection lens and the track carrying medium moving relative thereto depends, according to the present invention, upon the provision of an imperfect focus where the light beam illuminates the signal track. In one form of the invention, the focus of the light beam is maintained at a particular distance in front of or behind the plane of the record medium in which the tracks are located, in another form an astigmatic lens is used so that the focus will not be perfect at any distance from the projection lens, in which case the track can be caused to pass through any particular cross-section of the imperfect focal region, and in still another form of the invention, the light beam may be projected obliquely on the signal track so that only part of the illuminated spot of the track will be in a focussed portion of the light beam, but in any case the light beam must have at least sufficient width to span the width of the track and, of course, two photocells on either side of the projection of the track passing through the beam center must be provided in a position of the beam both beyond the focus and beyond the signal track, normally on the opposite side of the record medium from the light projector. The difference in the photoelectric currents of the respective photocells then provides a measure for the deviation of the reading light beam from the track center.

Instead of using an astigmatic lens, a cylindrical surface of only slight curvature (i.e. large radius of curvature) can be added to a normally constituted projection lens system, thus making the combined system astigmatic.

Although the remarkable fact of the present method of providing tracking signals is that it will operate with a transparent signal track in an opaque carrier medium, the method will also work with an opaque signal track on a transparent carrier medium. In the case of a reflecting carrier for the signal track, of course, the portions of the light beam "beyond" the track are then placed on the same side of the record medium as the light beam projector and a beam-splitter mirror may be used to illuminate photocells located in front of the record medium instead of behind it.

As shown in German disclosure document (OS) No. 23 13 741, it is already known to use an optical system to detect positioning errors of the record medium after the fashion of the Foucault experiment and to use two photocells for obtaining an error signal. In contrast to the present invention, however, that disclosure deals with the detection of positioning errors of the signal-bearing plane of the record with respect to the signal detection system and requires a relatively wide track (see FIG. 2 of that document) and, furthermore, requires that the reading light spot be otherwise located on the track. In that system a supplementary optical system is needed behind the track-bearing plane of the record (i.e. on the other side of the record from the light beam projector).

The present invention proceeds on the basis that the problem of detecting position errors of the record medium relative to the position of the projection optical system and relative to the signal detection system is already solved and, in particular, is suitably solved by the disclosure of an earlier patent application (P No. 22 59 604) owned in common with the present patent application. On this basis, the Foucault knife edge effect can be utilized in accordance with the present invention to provide a simple and highly effective tracking method and system. In this method, the lateral limits of the signal track provide two straight edges both located in the light spot that illuminates the track which unsymmetrically limit the light spot when the track deviates from its desired position. In the limiting case of the light spot just barely spanning the track, there will still be unsymmetrical illumination in case of deviation, even in the case of a transparent track on an opaque medium. The different signals obtained from the photocells can be amplified to provide a control signal for controlling a pivoted mirror in the light path between the light projector and the record medium to bring the light beam back to centered position on the track, or, with a strong enough control signal, the light projector could be moved to the same effect instead of swinging a mirror.

The invention is further described by way of illustrative example with reference to the accompanying drawings, in which:

FIGS. 1A, 1B, 1C, 1D, 1E and 1F are diagrams of light beam cross-section with different types of light distribution;

FIG. 2 is a diagrammatic cross-section of an optical record reading device utilizing the method of the invention;

Figure 3:
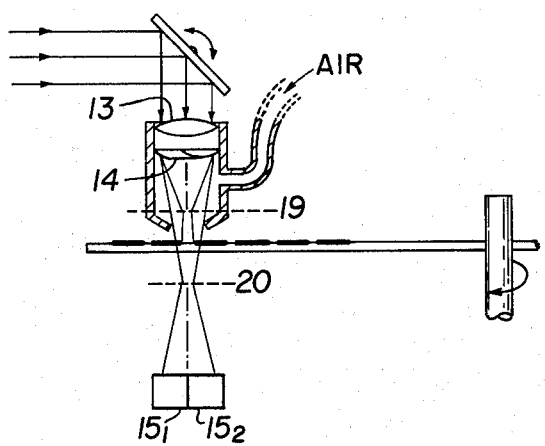
FIG. 3 shows an optical pick-up operating according to the method of the invention by means of a light beam projected by an astigmatic lens.

FIGS. 1A, 1B and 1C show the light distribution in a cross-section of the light beam behind the signal track when a high-quality lens is used for the case in which a small amount of defocussing is provided, for example, by positioning the focus immediately in front of the plane of the record medium that carries the signal track. Then, if the edge of a transparent track in an opaque medium is shifted to the left, a darkening of the light distribution in the left half of the beam is found, when the light spot is centered on the track there is a symmetrical brightness distribution, and when the edge is to the right, there is a darkening on the right, as respectively shown in FIGS. 1A, 1B and 1C. In the case of a lens system with aperture errors which cause distortion of the form of the focus spot (so that there is a sagittal and a meridonal line of focus) and the track lies between the lines of focus, the darkening can occur in the forms shown in FIGS. 1D and 1F, with uniform illumination, as shown in FIG. 1E, when the light spot is centered on the track.

In the optical signal pick-up apparatus shown in FIG. 2, the focus of the light beam is located below the transparent tracks $2_1$, $2_2$ and $2_3$ lying on the upper surface of the record plate 1. A lens 3 focusses the rays 4 of a laser in a focal plane behind the track bearing plane of the record 1. The laser light passing through the tracks excites the two photocells $5_1$ and $5_2$. If the light beam is positioned symmetrically with respect to the center of the track, the difference current of the cells is zero, but for deviation to the left or to the right, one or the other of the photocells is more strongly excited and a control signal can be derived from the difference current, for example for controlling the angular position of the mirror 6. The positioning of the focal plane can be stabilized in this arrangement by providing an air-bearing for the pick-up head constituted in such a way that an air current enters the lens housing 8 through a tube 7 and leaves the housing 8 through the lower opening that is kept clear for the passage of the light beam. A biasing force is resiliently applied to the mounting of the lens 3 directed against the record medium and, under these conditions, the position of the lens relative to the surface of the record 1 that carries the signal tracks is effectively stabilized.

FIG. 3 shows a similar optical pick-up utilizing the form of the method of the present invention in which an astigmatic lens is used to provide a light beam which is imperfectly focussed where it illuminates the signal track. In this case the astigmatic lens is of a compound type formed with a normal lens 13 in front of which a thin cylindrical lens 14 of low curvature has been placed. The signal track is in this case between the sagittal and the meridonal lines of focus, so that the differential effect detected at the photocells $15_1$ and $15_2$ is reduced by the phenomenon described in connection with FIGS. 1D and 1E. This type of system is operable even if the track is located at the position of one of the lines of focus or on the same side of both lines of focus, in which case it should not be far from the nearer line of focus.

In FIG. 3, because of the interposition of the cylindrical lens 14, which is shown with its cylindrical axis at an angle of 45° to the plane of the paper, while the optic axis is in the plane of the paper, there is a line of focus 19 oriented parallel to the axis of the cylindrical curvature of the lens 14 and there is another line of focus 20 at right angles thereto, where the rays unaffected by the cylindrical lens converge in the plane at right angles to the axis of the cylindrical curvature. The portion of the beam between the lines 19 and 20 is all more or less defocussed.

Figure 4:
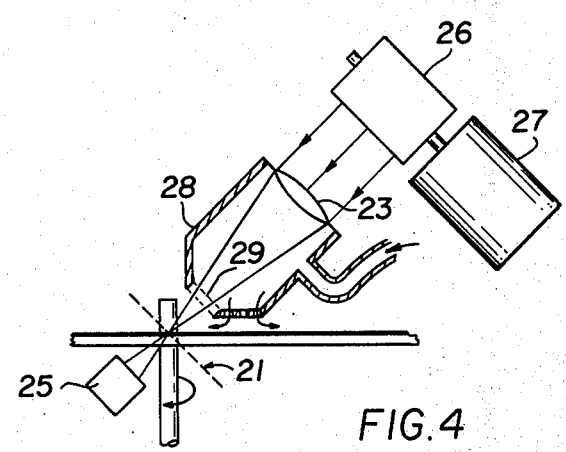
FIG. 4 shows an optical pick-up operating according to the method of the invention by means of an obliquely projected light beam.

FIG. 4 shows an arrangement in which the light beam is projected in a direction oblique to the record surface that carries the signal tracks. For reasons of symmetry, the obliquity is provided in the vertical plane which contains the direction of movement of the signal track past the light spot produced by the beam. The light spot may in this case, as illustrated, be centered on the focal plane, but because of the oblique incidence of the beam, only the central plane 21 across the light spot is in focus and the portions of the spot away from that central plane are more and more defocussed as they are distant therefrom.

FIG. 4 shows the movable mirror 26 from the rear: that is, it is illuminated from the opposite side from that visible in the drawing. It is controlled by a galvanometer or other fast servo motor indicated at 27. Because of the inclination of the chamber 28 enclosing the converging beam, the air-bearing must be provided by apertures in the bottom of that enclosure, while the light beam emerges through a transparent window 29. The photocell assembly 25 is in this case, like the mirror, seen end on, that is its two photocells are one behind the other, one on each side of the optic axis of the lens 23. As mentioned before, the focal plane of the beam is 21 and it intersects the record surface in a line which bisects the spot when the record is centered on the focal plane, but even in that case the portions of the light spot on the record which are to the left and to the right (in the drawing) of the intersection of the plane 21 with the record will be defocussed.

Of course several of the methods of providing a small amount of defocussing for the purposes of the invention and described above can be combined. Thus, in the case of FIG. 4, where oblique beam incidence is used to produce a small amount of defocussing, a further amount of defocussing may be provided by maintaining the focal plane in a position more or less above or below the surface of the record medium on which the signal track is located.

Figure 5:
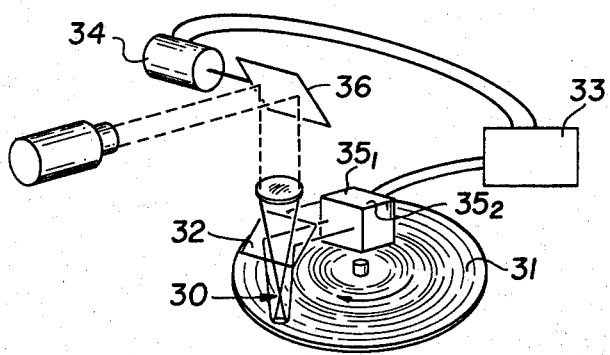
FIG. 5 shows an optical pick-up similar to that of FIG. 3 in which the focus of the light beam is in front of the signal track rather than behind it.

FIG. 5 shows a variant of the system of FIG. 2 in which the beam is focussed at the location 30 just barely above the record disk 31 instead of just below it, and in which instead of light transmitted through the record, light reflected back from the record and deflected by the beam-splitter mirror 32 and deflected to the pair of photocells $35_1$ and $35_2$ is utilized for producing the tracking signals through a differential amplifier circuit 33 for the galvanometer or other servo device 34 to swing the mirror 36. The beam-splitter mirror 32 is transparent for half of the incident light and reflects the other half. In all the figures the photocell for reading the record is omitted to simplify the illustration.

Although the invention has been described with respect to particular embodiments, it will be understood that further variations may be made within the inventive concept.

I claim:

1. Method of obtaining and utilizing control signals for laterally tracking an optical record track having sharp transitions from light to dark or vice versa at the sides of the track, by an optical reading device provided with light beam projector means for illuminating a spot on said track, said optical record being movably mounted for movement of said track past said spot, means for guiding the beam produced by said projector means laterally of said track in response to tracking control signals and means for detecting information recorded on said track by detecting light of said beam by a sensor centered with respect to said track, said method comprising the steps of:
    causing the light of said light beam, by means of an optical system, to converge in a focal region in the vicinity of a portion of said track;
    controlling the spacing between said optical system and said track so that said focal region is at a predetermined distance from said track measured along the axis of said beam as projected from said optical system, said distance being such that said beam is of a width at least sufficient to span the full width of said track, and
    differentially measuring the relative amounts of light of said beam projected beyond said track on the two sides of a bisector of said beam parallel to the longitudinal direction of the portion of said track illuminated by said beam to derive lateral tracking control signals by the Foucault principle when an edge of said track intersects a substantial portion of said beam and providing said tracking control signals to said guiding means to produce lateral control thereof with respect to said track in response to the differential measuring result.

2. Method as defined in claim 1, in which said spacing is controlled so that said focal region is between said optical system and said track.

3. Method as defined in claim 1, in which said spacing is controlled so that said focal region is on the other side of said track from said optical system.

4. Method of obtaining and utilizing control signals for laterally tracking an optical record having sharp transitions from light to dark or vice versa at the sides of the track, by an optical reading device provided with light beam projector means for illuminating a spot on said track, said optical record being movably mounted for movement of said track past said spot, means for guiding the beam produced by said projector means laterally of said track in response to tracking control signals and means for detecting information recorded on said track by detecting light of said beam by a sensor centered with respect to said track, said method comprising the steps of:
    causing the rays of said light beam, by means of an optical system, to converge in a focal region in the vicinity of said track, which focal region is partly outside of the intersection of the light beam and the plane of said track;
    controlling the spacing between said optical system and said track while said track and said optical record are moved relative to said projector means, in such a manner that the relative positions of said focal region relative to the illuminated portion of said track is maintained substantially the same and so that at its impingement on said track, said beam is of sufficient width to span the width of said track when centered thereon, and
    differentially measuring the relative amounts of light of said beam projected beyond said track on the two sides of a bisector of said beam parallel to the longitudinal direction of the portion of said track illuminated by said beam to derive lateral tracking control signals by the Foucault principle when an edge of said track intersects a substantial portion of said beam, and
    providing said tracking control signals to said guiding means to produce lateral control thereof in accordance with said differential measurement.

5. Method as defined in claim 4, in which said optical system is an astigmatic optical system, whereby said focal region in which the rays of said light beam converge is extended axially in said beam.

6. Method as defined in claim 4, in which said projector and guiding means are arranged so that the axis of said light beam as projected from said optical system, is oblique to the plane of the surface of said record on which said track is located, whereby portions of the illuminated spot on said track are caused to lie outside of said focal region.

* * * * *